(12) United States Patent
Chow et al.

(10) Patent No.: US 8,490,914 B2
(45) Date of Patent: Jul. 23, 2013

(54) LANDING GEAR WITH NOISE REDUCTION FAIRING

(75) Inventors: Leung Choi Chow, Bristol (GB); Philip Campbell, Stockport (GB); Christopher Wood, Congleton (GB); Andrew John Dyer, Bristol (GB)

(73) Assignee: Airbus Operations Limited, Bristol (GB)

( * ) Notice: Subject to any disclaimer, the term of this patent is extended or adjusted under 35 U.S.C. 154(b) by 705 days.

(21) Appl. No.: 12/458,407

(22) Filed: Jul. 10, 2009

(65) Prior Publication Data

US 2010/0155529 A1 Jun. 24, 2010

(30) Foreign Application Priority Data

Aug. 5, 2008 (GB) .................... 0814291.1

(51) Int. Cl.
*B64C 23/00* (2006.01)
(52) U.S. Cl.
USPC ................ 244/1 N; 244/130; 244/100 R
(58) Field of Classification Search
USPC .............. 244/1 N, 130, 100 R, 102 R, 103 R, 244/121
See application file for complete search history.

(56) References Cited

U.S. PATENT DOCUMENTS

| | | | |
|---|---|---|---|
| 4,408,736 A | 10/1983 | Kirschbaum et al. | |
| 2004/0104301 A1* | 6/2004 | Wickerhoff et al. | 244/10 |
| 2006/0060707 A1 | 3/2006 | Chow et al. | |
| 2008/0142634 A1* | 6/2008 | Moe et al. | 244/1 N |
| 2009/0321559 A1* | 12/2009 | Chow et al. | 244/1 N |

FOREIGN PATENT DOCUMENTS

| | | |
|---|---|---|
| EP | 1 067 045 | 1/2001 |
| EP | 1 382 526 | 1/2004 |
| EP | 1 977 969 | 10/2008 |
| GB | 557444 | 2/1942 |
| WO | WO 01/04003 | 1/2001 |
| WO | WO 2004/089743 | 10/2004 |

OTHER PUBLICATIONS

UK Search Report for Great Britain Application No. 0814291.1, dated Dec. 2, 2008.
UK Search Report for Great Britain Application No. 0814291.1, dated Feb. 2, 2009.

* cited by examiner

*Primary Examiner* — Timothy D Collins
*Assistant Examiner* — Jamie S Stehle
(74) *Attorney, Agent, or Firm* — Nixon & Vanderhye P.C.

(57) ABSTRACT

An aircraft noise reduction apparatus includes an aircraft landing gear assembly and a noise reduction fairing 12. The landing gear assembly includes a landing gear 10 arranged to be moveable between a stowed position and a fully deployed position. The noise reduction fairing 12 may include a wrap-around fairing which, when the landing gear 10 is in its fully deployed position, wraps around the landing gear 10 and extends along the majority of the length of a landing gear leg 11. A landing gear bay door assembly 16, 17 including at least one door may also be provided. The fairing 12 may have a recess 24 for accommodating one of landing gear bay doors when the door 16 is in its fully open position.

20 Claims, 7 Drawing Sheets

LANDING GEAR WITH NOISE REDUCTION FAIRING

This application claims priority to Great Britain Patent Application No. 0814291.1, filed 5 Aug. 2008, the entire content of which is hereby incorporated by reference.

The present invention relates to an aircraft landing gear and noise reduction assembly. More particularly, but not exclusively, the invention relates to an aircraft landing gear assembly designed to reduce the noise generated by the interaction of the landing gear and the air flowing past it during flight, landing and/or take-off.

BACKGROUND OF THE INVENTION

It is desirous to reduce the noise generated by aircraft, for example, to lessen disruption or inconvenience, resulting from aircraft noise, caused to the public on the ground near airports. A significant amount of noise is generated by the interaction of the aircraft and the air flowing past it, which results in turbulent flows and consequently noise. It is particularly important to reduce noise created during approach of the aircraft on landing. During approach, a significant contribution to the amount of noise that the aircraft generates is made by the landing gear, which is typically deployed early for landing for safety reasons. The deployment of the landing gear increases drag and assists deceleration of the aircraft. During take-off, noise from the landing gear is a less significant factor because engine noise is generally greater and because the landing gear is generally stowed at the earliest opportunity to reduce drag and aid take-off. During normal flight, the landing gear of an aircraft is typically stowed in a landing gear bay, the bay being closed off by doors so that no part of the landing gear is subjected to the air flow.

WO01/04003 describes an aircraft landing gear and apparatus including a plurality of attachments for noise reduction purposes. The attachments are shaped and positioned on the landing gear to deflect air away from noise-inducing components of the landing gear and to permit deflection and articulation movement and also stowage of the landing gear whilst the attachments are installed thereon. Noise-inducing parts of the landing gear are however still exposed to airflow.

WO2004/089743 describes an aircraft landing gear door assembly including a landing gear bay door for closing the aperture through which the landing gear is deployed. The door is additionally moveable so that at least a portion of the door acts as a fairing to reduce the noise caused by the landing gear, when the landing gear is in its fully deployed position. The landing gear bay door thus doubles up as a noise-reducing fairing. However, the ability of the door to reduce noise may need to be compromised in view of the need of the door to function additionally as a landing gear bay door. Also, complicated deployment mechanisms may need to be employed to allow the door additionally to be moved to a fairing position and/or configured as a fairing.

The present invention seeks to mitigate the above-mentioned problems. Alternatively or additionally, the present invention seeks to provide an improved aircraft landing gear noise reduction assembly.

SUMMARY OF THE INVENTION

The present invention provides, according to a first aspect, an aircraft noise reduction apparatus including an aircraft landing gear assembly and a noise reduction fairing as set out in claim 1. It will be noted that the noise reduction fairing wraps around the landing gear. In certain embodiments of the invention a single wrap-around fairing dedicated to noise reduction may thus be provided. The function of the noise reduction fairing need not therefore be compromised, and its design need not be complicated, by the need for the fairing to perform additionally the function of a landing gear bay door. Also, there may be a need to provide only one fairing for noise reduction, as opposed to many. It is preferred that the whole landing gear assembly, including the landing gear leg and wheels, is moveable for stowage in a landing gear bay.

The present invention provides, according to a second aspect, an aircraft noise reduction apparatus including an aircraft landing gear assembly and a noise reduction fairing as set out in claim 16. It will be noted that the noise reduction fairing includes a recess for accommodating a landing gear bay door. The noise reduction fairing may therefore assist in reducing noise that might otherwise be caused by a landing gear bay door or a part thereof.

A third aspect of the invention provides an aircraft as set out in claim 17. The present invention yet further provides, according to a fourth aspect, a noise reduction fairing as set out in claim 18. Preferred (but optional) features of the invention are set out in the dependent claims.

It will be appreciated that features of the present invention described in relation to one aspect of the invention are equally applicable to other aspects of the invention.

DESCRIPTION OF THE DRAWINGS

By way of example embodiments of the invention will now be described with reference to the accompanying schematic drawings, of which.

DETAILED DESCRIPTION

Figure 1A:
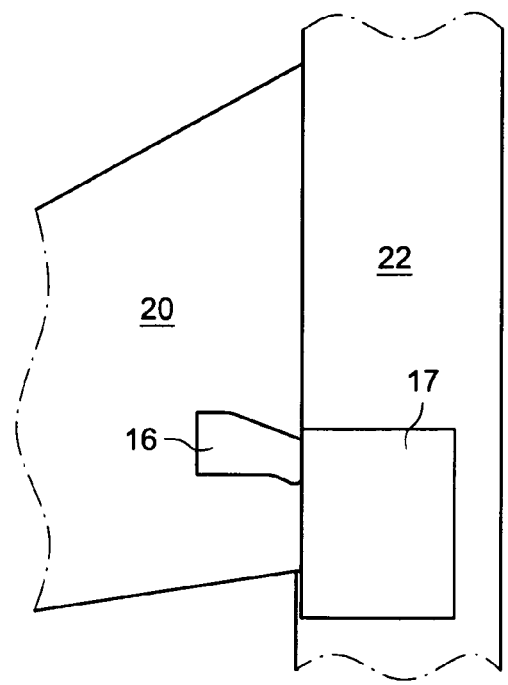
FIGS. 1a and 1b are views showing a section of an aircraft with closed landing gear bay doors and a stowed landing gear having a noise reduction fairing according to a first embodiment of the invention.
Figure 1B:
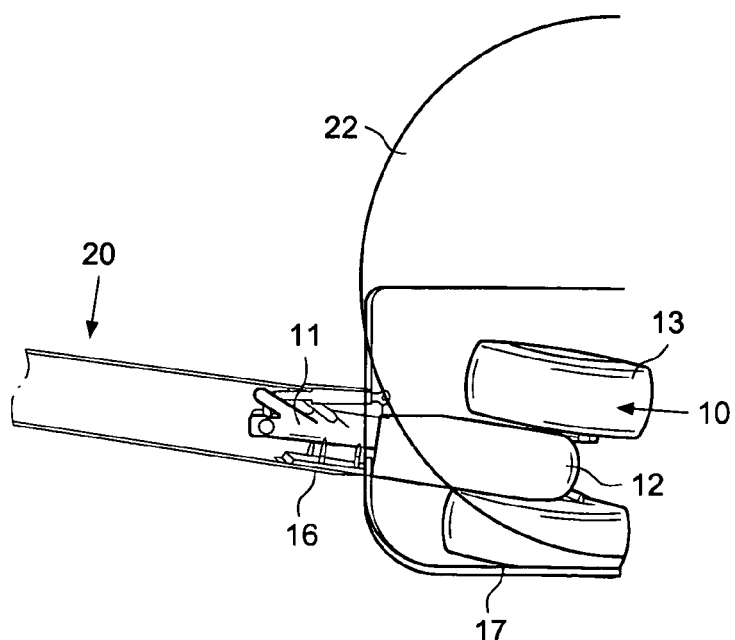

FIG. 1a shows a landing gear bay door assembly 16, 17 which forms part of the undercarriage assembly of an aircraft according to the first embodiment of the invention (FIG. 1a showing the closed doors when viewed from underneath the aircraft). The aircraft is of the type that has a wing-mounted landing gear 10 which is arranged to be moveable between a stowed position and a fully deployed position and which is of the short wing gear type having a trailing arm configuration. Inclusion of fairings for aerodynamic efficiency or for drag reduction is not therefore of importance, because the landing gear 10 will be stowed shortly after take-off. The aircraft includes a landing gear bay, which extends from the wing 20 to the fuselage 22. The landing gear bay door assembly thus includes a first door 16 which extends across part of a wing of the aircraft and a second door 17 which extends across part of the fuselage 22 of the aircraft. The doors 16, 17 are moveable to open or close the aperture 14 in the landing gear bay through which the landing gear 10 is deployed. FIG. 1a show the doors 16, 17 in their fully closed positions and with the landing gear 10 (not visible in FIG. 1a) in its stowed position. FIG. 1b is a sectional/cut-away view of the aircraft shown in FIG. 1a. Thus FIG. 1b shows the closed landing gear bay doors 16, 17 and a stowed landing gear 10. The landing gear 10 in its stowed position is arranged such that part of the landing gear leg 11 is stowed in the aircraft wing 20, whereas the landing gear wheel assembly 13 is stowed in the aircraft fuselage 22.

Figure 2A:
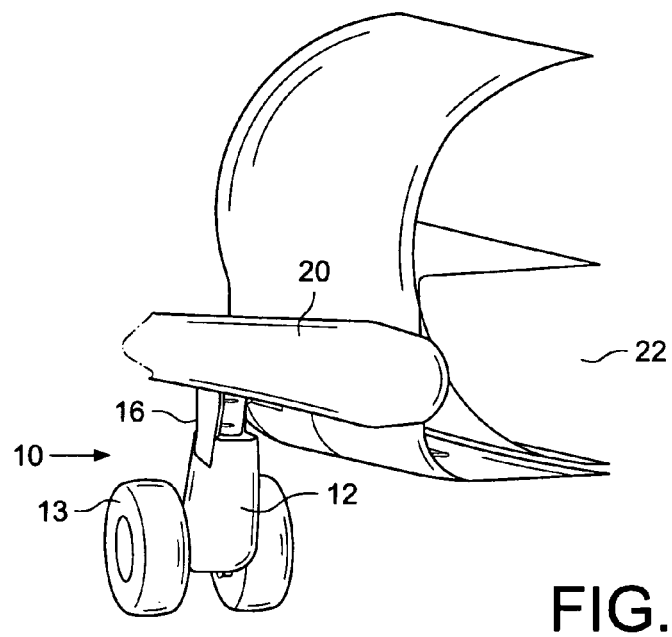
FIGS. 2a and 2b are views showing the aircraft section of FIGS. 1a and 1b with the landing gear bay doors open and the landing gear deployed.
Figure 2B:
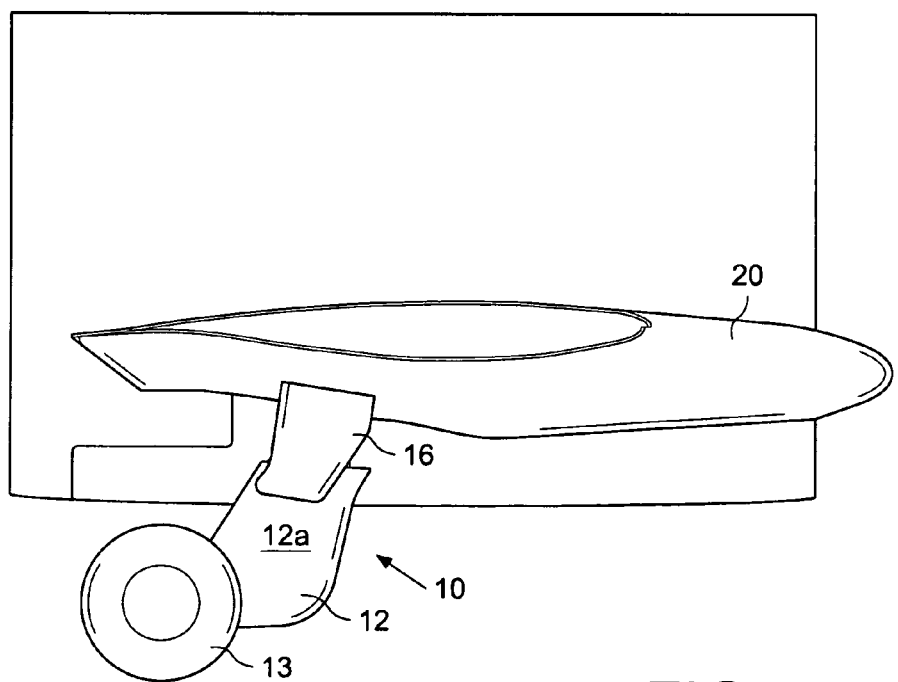
Figure 3A:
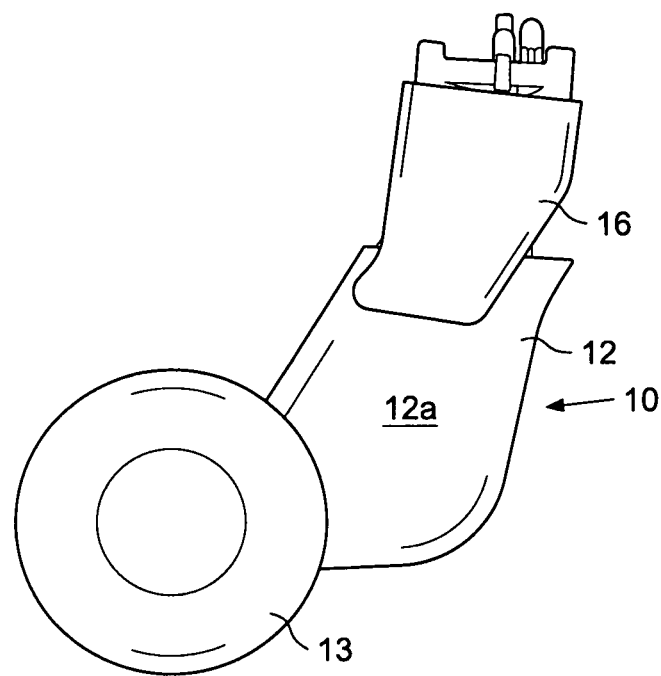
FIGS. 3a, 3b, 3c and 3d are views showing the aircraft landing gear assembly in the deployed position.
Figure 3B:
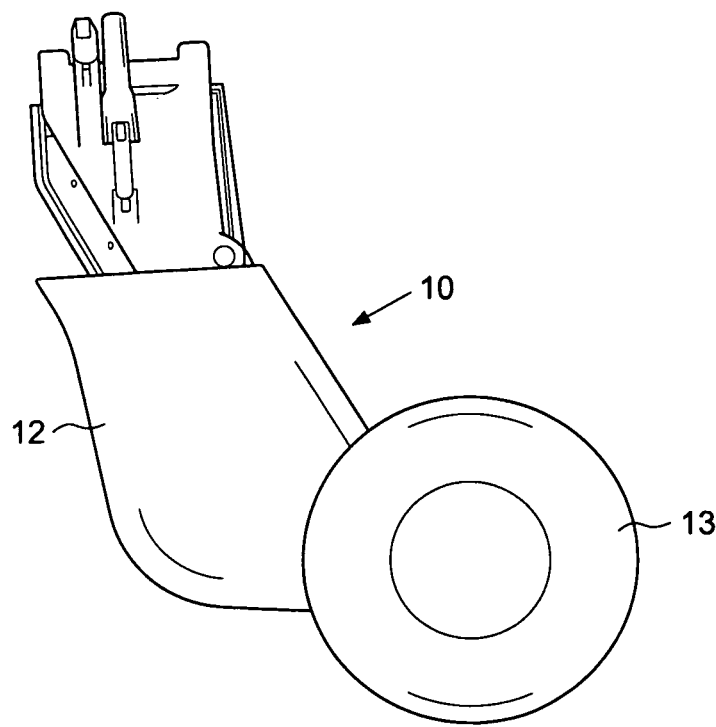
Figure 3C:
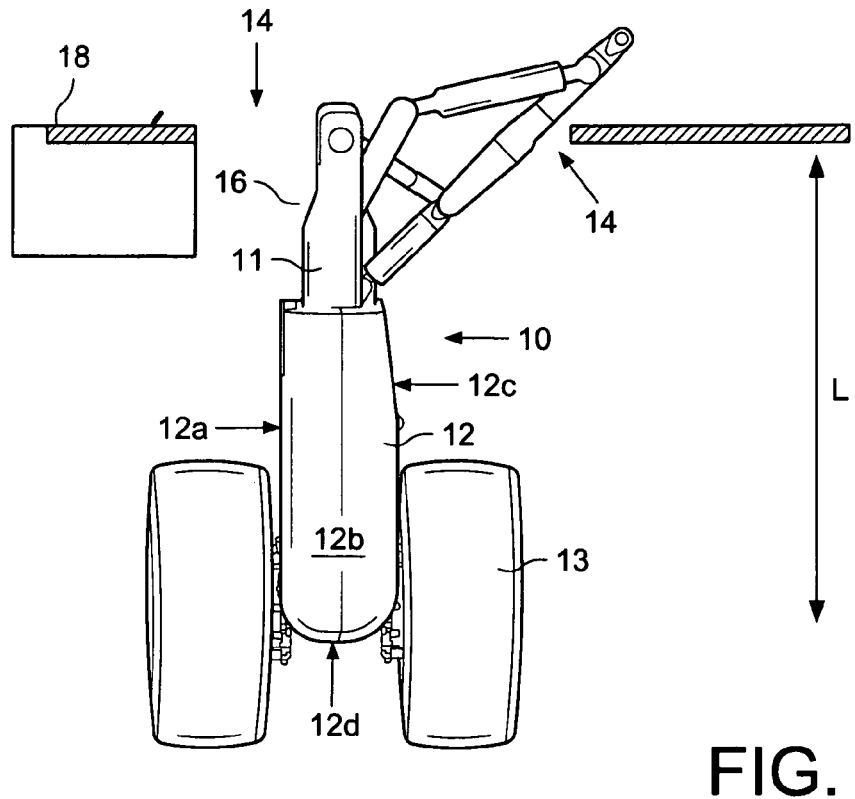
Figure 3D:
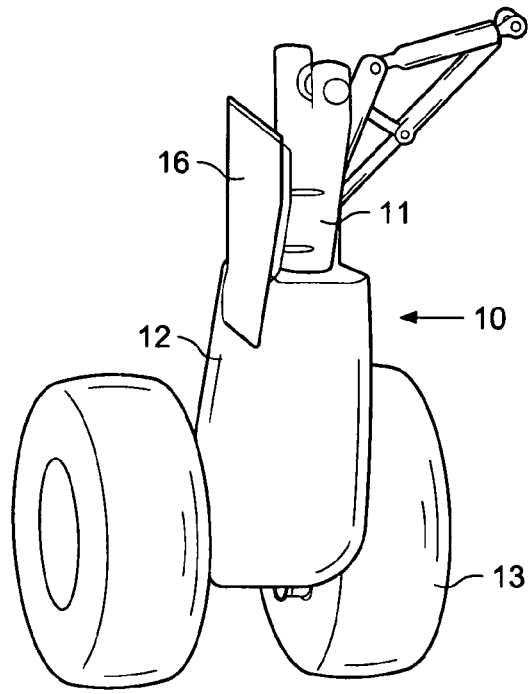

The landing gear 10 includes a noise reduction fairing 12 according to the first embodiment of the invention. The fairing 12 is made of lightweight stiff composite material (but could of course be made from materials other than composites). The landing gear 10 is moved to its deployed position by rotating the landing gear 10 in an outboard direction away from the fuselage 22 and through the aperture 14. FIGS. 2a and 2b show the landing gear 10 in its fully deployed position. In the context of the presently described embodiment, the landing gear 10 is in its fully deployed position once the landing gear 10 is in a position ready for touch-down on landing. The landing gear 10 is typically fully extended in such a position.

With reference to FIGS. 2a to 4, showing the landing gear 10 is in its fully deployed position, the noise reduction fairing 12 on the landing gear 10 comprises a wrap-around fairing 12 which wraps around the landing gear 10 and extends along the majority of the length of the landing gear leg 11. In the context of the noise reducing function of the first embodiment, the "length" L of the landing gear leg 11 of importance is the region which would otherwise be exposed to the airflow and which might otherwise contribute to noise. Thus the "length" of L the landing gear leg 11 may be measured from the point at which the leg 11 first exits the landing gear bay to the bottom of the leg 11 where the wheel assembly 13 is attached. The noise reduction fairing 12 preferably wraps around the landing gear 10 for the majority of the length of the landing gear leg 11.

It will be noted that the fairing 12 does not completely envelop the landing gear 10, but that the landing gear 10 is fully faired by the noise reduction fairing 12. (The aft and upper regions, and only those regions, of the fairing are open.) It is not necessary for the fairing 12 to wrap completely around the landing gear leg 11, and to cover the aft region of the leg 11, to perform the function of noise reduction. Moreover, ensuring that the wrap-around fairing 12 is open at an aft region may aid access and servicing. Similarly, an upper portion may be left open to aid access and servicing. Thus, in regions where the fairing 12 "wraps around" the landing gear 10, the fairing 12 extends from a position aft and inboard of the landing gear structure 10 (when the landing gear 10 is fully deployed) around the fore side of the landing gear structure 10 and then to a position aft and outboard of the landing gear structure 10. Thus the landing gear 10 is bound by the fairing 12 on at least three of its four sides.

As a result of the fairing 12 wrapping around so much of the landing gear assembly 10, separate fairings or treatments for the purposes of noise reduction are rendered unnecessary.

Figure 4:
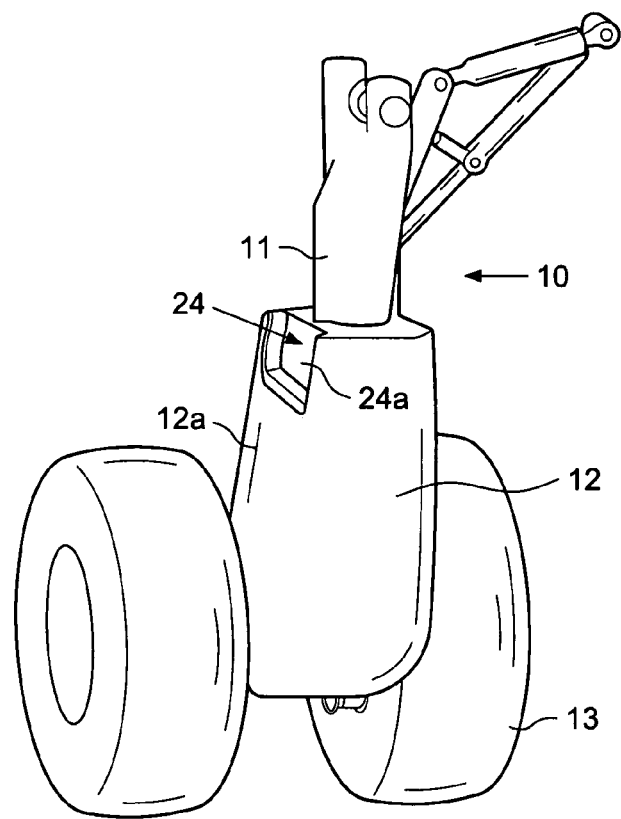
FIG. 4 is a view showing the aircraft landing gear assembly in the deployed position, with a landing gear bay door omitted.

As shown in FIG. 4, which shows the landing gear assembly 10 in its deployed position but omits the first (outboard) door 16 for the sake of clarity, the fairing 12 has a recess 24 which accommodates the first door 16 when the door is in its fully open position. The recess 24 is positioned on the outboard surface 12a of the fairing 12. Accommodating the door 16 in this recess 24 further aids noise reduction. The door preferably fits flush in the recess 24. The recess 24 could be in the form of a hole, but it is preferred that the recess 24 has a back surface 24a for abutting the door when the landing gear 10 is fully deployed. The door 16 and the fairing 12 are spaced apart when the door 16 is closed and the landing gear 10 is in the stowed position.

Figure 5A:
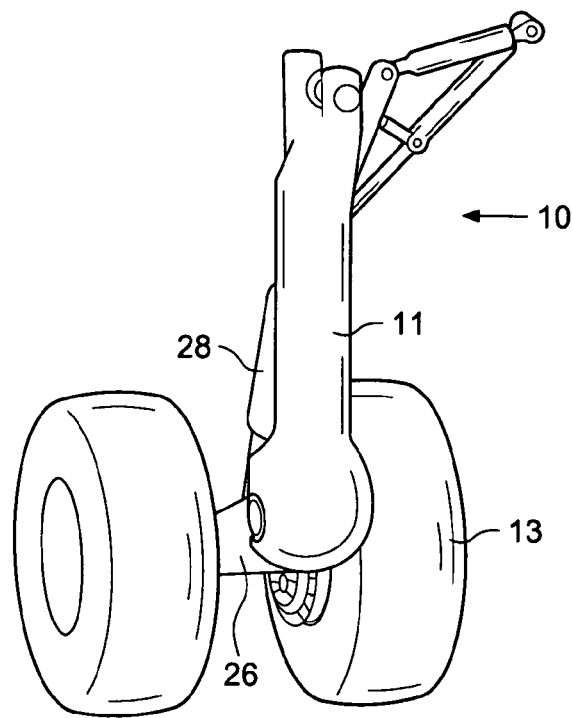
FIGS. 5a and 5b are views showing the aircraft landing gear assembly in the deployed position, with the noise reduction fairing and doors omitted.
Figure 5B:
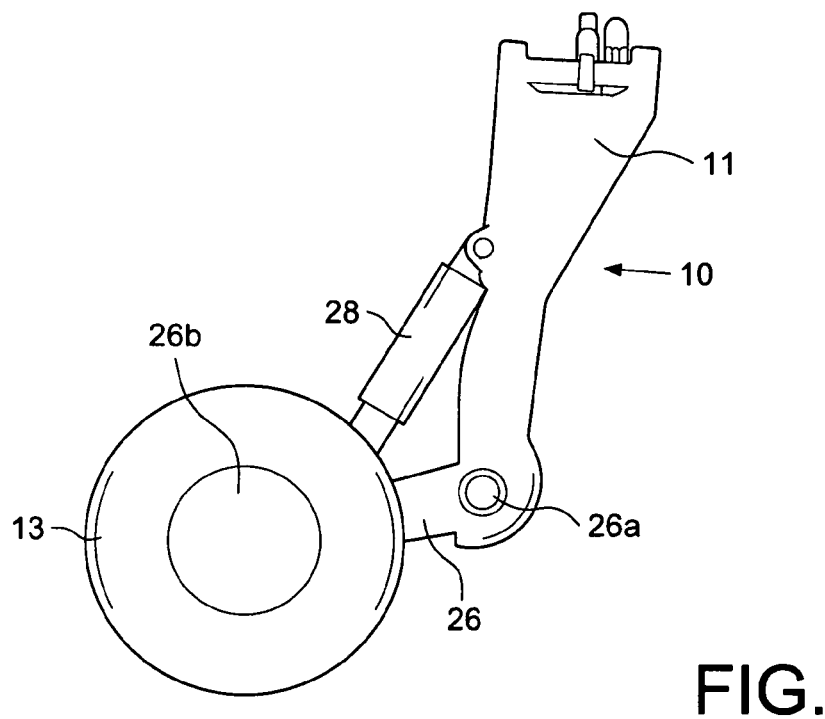

FIGS. 5a and 5b show the landing gear 10 in its fully deployed position, but with the noise reduction fairing 12 and doors 16, 17 omitted for the sake of clarity. As can be seen from FIGS. 5a and 5b, the landing gear 10 comprises a fixed length landing gear leg 11 and a trailing arm 26. The trailing arm 26 is rotatably mounted on the landing gear leg 10 at one end 26a, the landing gear wheel assembly 10 being mounted at the other end 26b of the trailing arm 26. Thus, whilst the landing gear leg 10 is of fixed length, the effective length of the landing gear assembly 10 is adjustable, by means of the rotatable trailing arm 26. Having a trailing arm configuration simplifies the construction and configuration of the noise reduction wrap-around fairing 12. Also, trailing arm undercarriages do not need torque links, thereby eliminating another part of the landing gear assembly which might otherwise generate noise or need to be faired.

It will be seen that the landing gear assembly 10 also includes a shock absorbing unit 28 which extends from the landing gear leg 11 to region at the end 26b of the trailing arm 26 nearest the wheel assembly 13. The wrap-around fairing 12 wraps around the trailing arm 26, the shock absorbing unit 28 and the axle on which the wheel assembly 13 is mounted. Thus, with reference to FIGS. 3a, 3b and 3c, the wrap-around fairing 12 includes an outboard (on the left side in FIG. 3c) fairing surface 12a extending in a substantially streamwise direction, an inboard (on the right side in FIG. 3c) fairing surface 12c extending in a substantially streamwise direction, a front fairing surface 12b extending between the inboard and outboard fairing surfaces 12a, 12c and a bottom fairing surface 12d bound by the front fairing surface 12 and the inboard and outboard fairing surfaces 12. The terms "inboard", "outboard", "left", "right", "front", and "bottom" are all with reference to the fairing 12 when the landing gear 10 is in its deployed position when viewed in a direction fore-to-aft. The front fairing surface 12b and the bottom fairing surface 12d have a smooth and aero- and acoustically-efficient shape.

The wrap-around fairing 12 is removably attached to the landing gear assembly 10 by means of releasable fixings. The fairing 12 is formed of two halves removable secured to each other. Each half is defined by a suitably strengthened skin. The halves have a skin thickness that does not vary greatly across the fairing and are therefore shell-like in construction. The whole fairing 12 itself can therefore be quickly detachable. During use, the fairing 12 is mounted in fixed relation to the landing gear leg 10.

Figure 6A:
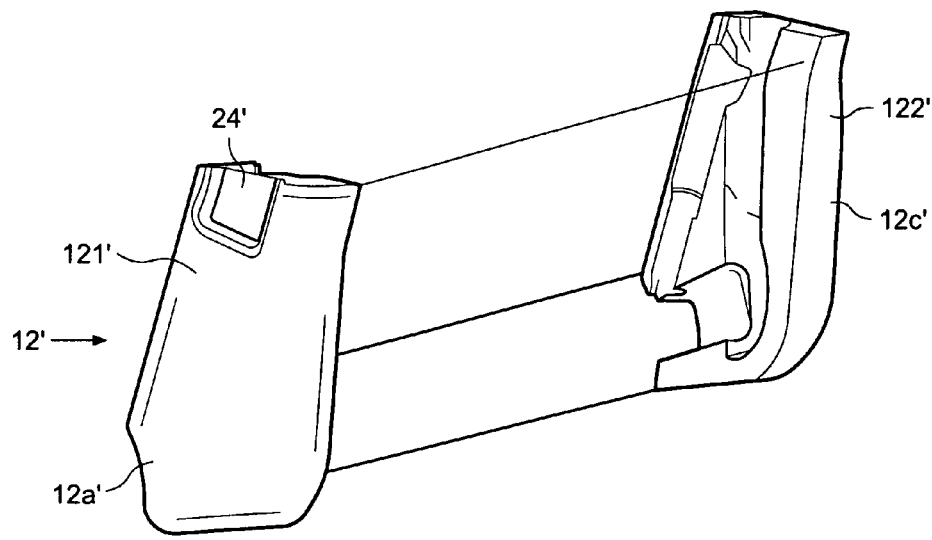
FIGS. 6a, 6b, and 6c are views showing an exploded view of a noise reduction fairing according to a second embodiment of the invention.
Figures 6B, 6C:
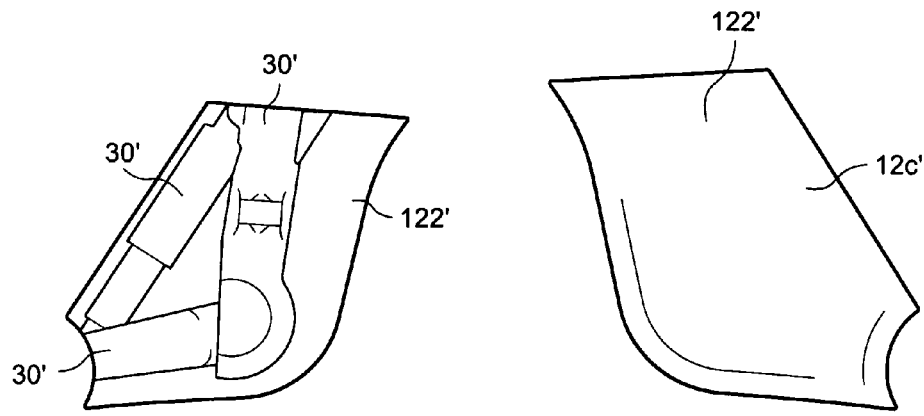

FIGS. 6a, 6b and 6c show a noise reduction fairing 12' according to a second embodiment of the invention (with similar parts being labelled with the same reference numeral, but followed by the prime symbol '). The fairing 12' of the second embodiment differs from the fairing 12 of the first embodiment in that the fairing 12' has an inner surface that gives the fairing more volume, in contrast to the shell-like arrangement of the fairing 12 of the first embodiment. The fairing 12' is shown is a dismantled state. FIG. 6a shows that the faring 12' has two parts, an outboard portion 121' and an inboard portion 122'. FIGS. 6b and 6c show the two sides of the inboard portion 122'. The interior of the fairing 12' is shaped to accommodate the trailing arm 26', the lower section of the landing gear leg (not shown in FIGS. 6a to 6c) and the shock absorbing unit 28 and thus the interior of the fairing 12' includes corresponding shaped recesses 30'. The releasable fixings both releasably attach the two halves 121', 122' of the fairing 12' together and releasably attach the fairing 12' to the landing gear leg.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the illustrated embodiments, the outer surface of the fairing 12 is defined by solid material. Alternatively, part (or possibly all) of the fairing could be made of mesh or perforated material to further aid noise reduction.

In certain embodiments, the fairing with the recess for accommodating the door need not wrap around the landing gear. In certain embodiments, the fairing may fully wrap around the landing gear at particular regions so that the landing gear is bound by the fairing on all four sides.

The noise reduction fairing may in certain embodiments of the invention have a geometry that is changeable. For example, the noise reduction fairing may include a part that moves to improve ground clearance and/or is moveable to improve stowability of the fairing. The fairing may have a hinge relative to the upper portion to provide the necessary ground clearance, for example in maximum gear compression and flat tyre cases. For example, the wrap-around fairing may include a lower section arranged for rotational movement to provide ground clearance. Not only the lower section but also the rest of the wrap-around fairing may be arranged for such rotational movement. The whole of the fairing may for example be arranged to be rotatably relative to the landing gear leg. It is however preferred that at least part of the fairing is mounted in fixed relation relative to the landing gear leg. Having a section of the fairing that hinges to improve ground clearance (in the case of a fully compressed gear with flat tyres) may enable the fairing to be designed to extend across a greater length of the landing gear assembly, than might otherwise be the case.

It will of course be appreciated that whilst the first embodiment concerns reducing noise caused by a short wing gear with a trailing arm (which in certain configurations may have an acoustically efficient shape for noise reduction purposes), the invention has application to landing gear assemblies in other positions/configurations on the aircraft. The noise reduction fairing may for example be associated with a nose landing gear, or a main landing gear assembly associated primarily with the fuselage. The landing gear leg may be telescopic and incorporate shock absorbing function along its length. In such cases, the wheel assembly may be mounted, possibly via a bogey, at the end of the landing gear leg, and there need not be a trailing arm.

In certain embodiments, the wrap-around fairing need not include any recess for accommodating doors or any other part of the landing gear assembly.

The landing gear assembly preferably has only one noise reduction fairing. In certain alternative embodiments, there may be provided more than one fairing per landing gear assembly.

Whilst the noise reduction apparatus of the above embodiments may have benefit on smaller aircraft, the present invention is of greater application to medium to large commercial aircraft. The aircraft is preferably heavier than 40 tonnes dry weight, and more preferably heavier than 200 tonnes dry weight. The aircraft is preferably of a size equivalent to an aircraft designed to carry more than 75 passengers, and more preferably more than 200 passengers.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. Aircraft noise reduction apparatus including an aircraft landing gear assembly and a noise reduction fairing, wherein
   the landing gear assembly comprises a landing gear leg arranged to be moveable between a stowed position and a fully deployed position, said leg having a length extending from an upper end substantially near a fuselage to a lower end at which at least one landing gear wheel assembly is located, and
   the noise reduction fairing comprises a wrap-around fairing, wherein the wrap-around fairing includes a left fairing surface extending in a substantially streamwise direction, a right fairing surface extending in a substantially streamwise direction, a front fairing surface extending between the left and right fairing surfaces and a bottom fairing surface bound by the front fairing surface and the left and right fairing surfaces, wherein said bottom fairing surface is at said lower end of said leg, said fairing, when the landing gear leg is in said fully deployed position, wraps around the landing gear leg and extends along a majority of said length.

2. Apparatus according to claim 1, wherein the apparatus further includes:
   a landing gear bay having an aperture; and
   the landing gear leg is mounted for movement between said stowed position in which the landing gear is stowed in the landing gear bay and said fully deployed position.

3. An aircraft noise reduction apparatus including an aircraft landing gear assembly and a noise reduction fairing, wherein
   the landing gear assembly comprises a landing gear leg arranged to be moveable between a stowed position and a fully deployed position, said leg having a length extending from an upper end to a lower end at which at least one landing gear wheel assembly is located, and
   the noise reduction fairing comprises a wrap-around fairing, wherein the wrap-around fairing includes a left fairing surface extending in a substantially streamwise direction, a right fairing surface extending in a substantially streamwise direction, a front fairing surface extending between the left and right fairing surfaces and a bottom fairing surface bound by the front fairing surface and the left and right fairing surfaces, wherein said bottom fairing surface is at said lower end of said leg, said fairing, when the landing gear leg is in said fully deployed position, wraps around the landing gear leg and extends along a majority of said length, wherein the apparatus further includes:
   a landing gear bay having an aperture; and
   the landing gear leg is mounted for movement between said stowed position in which the landing gear is stowed in the landing gear bay and said fully deployed position, wherein the apparatus further includes a landing gear bay door assembly comprising at least one door, the door assembly being moveable between (i) an open configuration in which the aperture of the landing gear bay is sufficiently exposed to allow deployment of the landing gear leg and (ii) a closed configuration, and the fairing has a recess which accommodates said at least one door when the landing gear bay door assembly is in the open configuration.

4. Apparatus according to claim 3, wherein the recess is positioned on an outboard surface of the fairing, when the landing gear leg is fully deployed.

5. Apparatus according to claim 2, wherein the landing gear assembly comprises a landing gear wheel assembly, the landing gear bay extends from an aircraft wing to an aircraft fuselage, and the landing gear assembly is mounted for movement such that when the landing gear assembly is in a stowed position, the landing gear leg is at least partly stowed in the aircraft wing and the landing gear wheel assembly is at least partly stowed in the aircraft fuselage.

6. Apparatus according to claim 1, wherein the landing gear assembly comprises a fixed length landing gear leg.

7. Apparatus according to claim 1, wherein the landing gear assembly comprises a landing gear wheel assembly, and a trailing arm having a first end rotatably mounted on the landing gear leg and a second end on which the landing gear wheel assembly is mounted.

8. Apparatus according to claim 7, wherein the landing gear assembly further comprises a shock absorber which extends from the landing gear leg to one of the landing gear wheel assembly and the trailing arm.

9. Apparatus according to claim 8, wherein the wrap-around fairing wraps around the shock absorber.

10. Apparatus according to claim 7, wherein the wrap-around fairing wraps around the trailing arm.

11. Apparatus according to claim 1, wherein the wrap-around fairing is open at an upper region.

12. Apparatus according to claim 1, wherein the wrap-around fairing is open at an aft region.

13. Apparatus according to claim 1, wherein the wrap-around fairing is removably attached to the landing gear assembly by means of releasable fixings.

14. Apparatus according to claim 1, wherein the wrap-around fairing includes a lower section arranged for rotational movement to provide ground clearance.

15. Aircraft noise reduction apparatus including an aircraft landing gear assembly and a noise reduction fairing, wherein the landing gear assembly comprises a landing gear bay having an aperture, a landing gear leg configured for movement between a stowed position in which the landing gear assembly is stowed in the landing gear bay and a fully deployed position, and a landing gear bay door assembly comprising at least one door, the door assembly being moveable between (i) an open configuration in which the aperture of the landing gear bay is sufficiently exposed to allow deployment of the landing gear and (ii) a closed configuration, and the fairing has a recess which accommodates said at least one door when the door assembly is in said open configuration.

16. An aircraft including an aircraft noise reduction apparatus according to claim 1.

17. A noise reduction fairing for mounting on an aircraft landing gear leg, said leg having a length extending from an upper end substantially near a fuselage to a lower end, said lower end having a landing gear wheel assembly located thereon, said fairing comprising:

a left fairing surface;

a right fairing surface, the left and right fairing surfaces extending in substantially the same general direction;

a front fairing surface extending between the left and right fairing surfaces; and a bottom fairing surface bound by the front fairing surface and the left and right fairing surfaces, wherein said bottom fairing surface is at said lower end of said landing gear leg and said noise reduction fairing wraps around and extends along a majority of said landing gear leg length.

18. Apparatus according to claim 15, wherein the recess is positioned on an outboard surface of the fairing, when the landing gear assembly is fully deployed.

19. Apparatus according to claim 1, wherein the wrap-around fairing is made of lightweight stiff material.

20. Apparatus according to claim 15, wherein the noise reduction fairing is made of lightweight stiff material.

* * * * *